United States Patent
Du et al.

(10) Patent No.: US 9,090,756 B2
(45) Date of Patent: Jul. 28, 2015

(54) TIRE WITH COMPONENT COMPRISED OF RUBBER COMPOSITION CONTAINING SILICA AND GRAPHENE PLATELET REINFORCEMENT

(71) Applicant: The Goodyear Tire & Rubber Company, Akron, OH (US)

(72) Inventors: Ling Du, Fairlawn, OH (US); Xiaoping Yang, Streetsboro, OH (US); Carl Trevor Ross Pulford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 392 days.

(21) Appl. No.: 13/690,143

(22) Filed: Nov. 30, 2012

(65) Prior Publication Data
US 2014/0155544 A1 Jun. 5, 2014

(51) Int. Cl.
*C08K 7/18* (2006.01)
*B82Y 30/00* (2011.01)
*C08K 3/04* (2006.01)
*C08L 9/00* (2006.01)
*C01B 31/04* (2006.01)
*B60C 1/00* (2006.01)
*C08K 3/36* (2006.01)

(52) U.S. Cl.
CPC ... *C08K 3/36* (2013.01); *C08K 3/04* (2013.01); *B82Y 30/00* (2013.01); *C08K 2201/011* (2013.01)

(58) Field of Classification Search
CPC .......... C08K 3/04; C08K 3/36; C08K 3/0033; B82Y 30/00; B82Y 40/00; C08L 9/00; C08L 7/00; C08L 25/10; C01B 31/0423; C01B 31/04; C01B 31/0438; C01B 31/0469; C08B 2204/32; B60C 1/00; B60C 1/0016; B60C 1/0008; B60C 2001/0058; B60C 2001/0033
USPC ................................ 524/495, 575.5; 977/755
See application file for complete search history.

(56) References Cited

U.S. PATENT DOCUMENTS

| | | | |
|---|---|---|---|
| 6,892,774 B2 | 5/2005 | Mori et al. | 152/151 |
| 7,224,407 B2 | 5/2007 | Yoshii et al. | 348/638 |
| 7,479,516 B2 | 1/2009 | Chen et al. | 524/495 |
| 2006/0229404 A1* | 10/2006 | Lechtenboehmer | 524/495 |
| 2006/0241237 A1* | 10/2006 | Drzal et al. | 524/495 |

* cited by examiner

*Primary Examiner* — Ling Choi
*Assistant Examiner* — Ronald Grinsted
(74) *Attorney, Agent, or Firm* — Henry C. Young, Jr.

(57) ABSTRACT

This invention relates to a rubber composition comprised of diene-based elastomer, precipitated silica and nano-scale exfoliated graphene platelets. A tire is provided having a component comprised of such rubber composition.

20 Claims, 1 Drawing Sheet

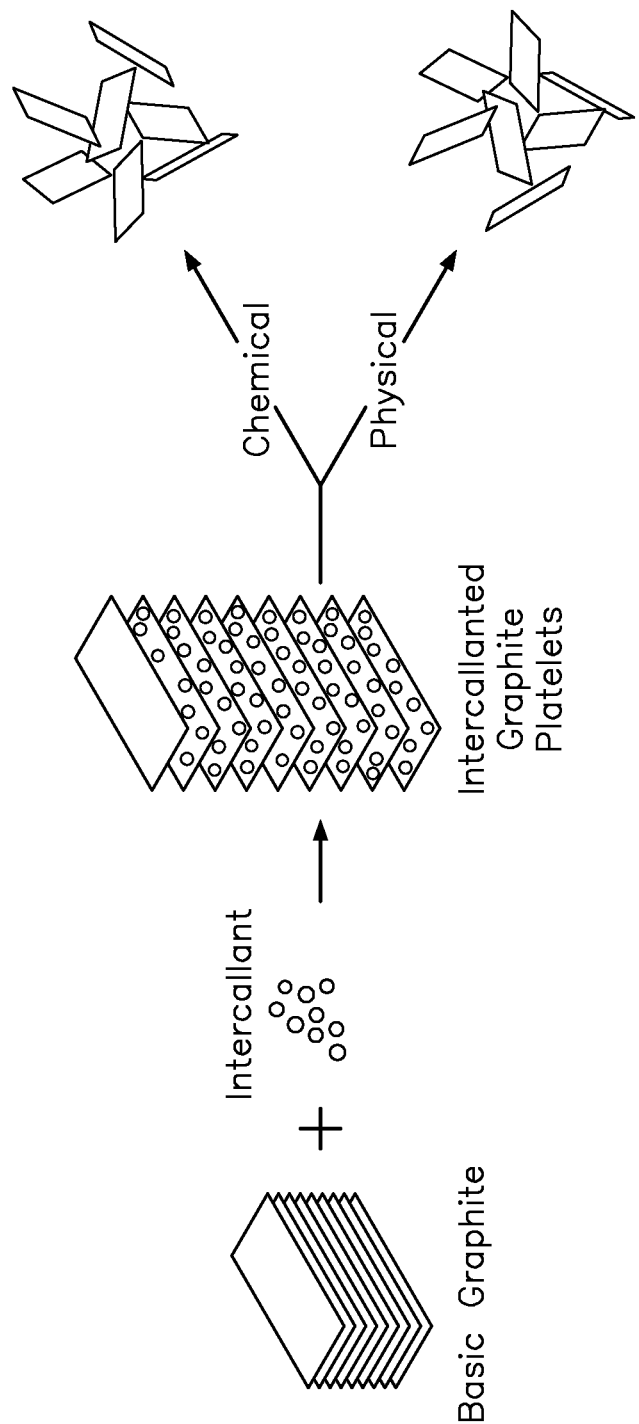

TIRE WITH COMPONENT COMPRISED OF RUBBER COMPOSITION CONTAINING SILICA AND GRAPHENE PLATELET REINFORCEMENT

FIELD OF INVENTION

This invention relates to a rubber composition comprised of diene-based elastomer, precipitated silica and nano-scale exfoliated graphene platelets. A tire is provided having a component comprised of such rubber composition.

BACKGROUND OF THE INVENTION

Various rubber compositions, particularly rubber compositions containing diene-based elastomers, usually contain particulate reinforcing fillers to promote enhanced physical properties of the rubber composition. Such reinforcing fillers include, for example, one or more of rubber reinforcing carbon black and amorphous synthetic silica such as, for example, precipitated silica. Such rubber reinforcing fillers and their use in reinforcing elastomers, in general, are known to those having skill in such art.

Exfoliated graphene platelets are platelets which have been exfoliated from intercalated graphite layered planes.

Exfoliated graphene platelets have been suggested as being useful to aid in promoting one or more of electrical, thermal and mechanical properties for various polymers such as thermoplastic or thermoset polymers. Graphene platelets have been suggested for use in rubber compositions for tire components. For example, and not intended to be limiting, see U.S. Pat. Nos. 7,479,516, 7,224,407 and 6,892,774 and Patent Publication No. 2006/0229404.

In the above mentioned U.S. Pat. No. 6,892,774, rubber compositions containing diene-based elastomer(s) rubber with expanded graphite have been suggested, particularly for tire treads for ice traction, while maintaining abrasion resistance. The expandable graphite is said to have a particle size of from 30 to 600 micrometers. The expandable graphite is said to be composed of sheets formed from graphite stacked in layers and as being a known material and produced by a known method which may comprised of, for example, immersing graphite particles in a strong acid (e.g. sulfuric acid) and oxidizing substance (e.g. nitric acid) followed by an intercalation treatment to insert the acid between layers of the graphite particles to thereby provide expandability of the graphite. The expandable graphite is then expanded by vaporizing the interlayer compound (e.g. at a temperature of about 300° C., or possibly even as low as 160° C. in the rubber composition). Apparently expandable graphite having an expansion initiating temperature of 190° C., or less, are said to be commercially available.

In the above mentioned U.S. Patent Publication No. 2006/0229404, rubber compositions containing diene-based elastomer(s) have been suggested containing an exfoliated graphite having been intercalated with an elastomer. For such intercalating method, the graphite is intercalated in a manner similar to the above method with acid and oxidizing material and then expanded, or exfoliated, by sudden exposure to high heat following which the expanded graphite is mixed with suitable monomers which are polymerized to form an elastomer matrix which contains the exfoliated graphite which, in turn, may be used to form a component of a tire.

For use in this invention, exfoliated graphene platelets may be formed by intercalation of natural graphite with its layered planes followed by exfoliation of the intercalated graphite. Intercalation of the graphite layered planes may be accomplished, for example, by immersing the natural graphite in a mixture of high concentration of strong acid (e.g. sulfuric acid) together with an oxidizing agent (e.g. potassium permanganate or nitric acid) followed by an intercalation treatment to introduce the acid and oxidizing agent into the galleries between the layered planes of the graphite to form an interlayered product and thereby intercalate the graphite layers (e.g. the galleries between the layers). As a part of the intercalation process, the galleries may be expanded to thereby increase the distance between the plates.

The layers, or planes, of the intercalated graphite galleries may then be physically or chemically exfoliated, or separated, to form individual graphene platelets by, for example, thermal expansion, or ultrasonication followed by a reduction using hyrazine in a water suspension.

For this invention, it is proposed to evaluate use of nano-sized exfoliated graphene platelets in a rubber composition.

For such evaluation, it is desired for the somewhat irregular shaped exfoliated graphene platelets to be nano-sized in a sense that they have an average thickness in a range of from about 1 nm to about 5 nm and an average lateral dimension in a range of from about 0.1 micrometer to about 1 micrometer (e.g. about 0.01 to about 1 square micrometers), desirably in a range of from 0.1 micrometer to about 0.5 micrometer (e.g. about 0.01 to about 0.25 square micrometers).

It is envisioned that such nano-sized exfoliated graphene platelets with, for example, an average lateral dimension in a range of from about 0.1 to 1 micrometer have an average surface area per gram in a range of from about 20 to about 800 $m^2/g$ (square meter per gram).

To achieve such nano-sized exfoliated graphene platelets, intercalation of the graphite may be conducted, for example, by extended oxidation such as, for example, by exposing the graphite to the aforesaid oxidation process for a sufficient period of time cause the planes to be broken up, or fractured, into small particle sizes to promote a creation of the nano-scale, or nano-sized, exfoliated graphene platelets.

As previously, indicated, an important aspect of this evaluation is the use of the aforesaid exfoliated graphene platelet with nano-scale thickness and submicro-scale lateral dimension size to promote exfoliated graphene platelet dispersion and various rubber physical properties for the rubber composition as well as to promote electrical conductivity for the rubber compositions used in various tire components. As previously indicted, an average lateral dimension of the nano-scale exfoliated graphene platelets is preferably less than 1 micrometer, and desirably less than 0.5 micrometer to promote the best graphene platelet/rubber dispersion and graphene platelet/rubber interaction to promote mechanical reinforcement of rubber compositions for tire components, as well as for an improved electrical conductivity of the rubber composition. It is believed that such observation and development is a departure from past experience for tire components which contain exfoliated graphene platelet reinforcement using significant larger graphene platelets.

The electrical conductivity of exfoliated graphene platelets in rubber compositions is highly anisotropic. The in-plane electrical conductivity of the graphene platelets is very high, in the range of $10^4$ to $10^6$ S/cm. However, the through-plane electrical conductivity of the graphene platelets is very low, at the range of 0.01 to 1 S/cm.

Therefore, the electrical conductivity of the rubber composition is much higher when exfoliated graphene platelets are primarily dispersed randomly in the rubber composition due to non-varnishing electrical conductivity which thereby renders the rubber composition containing randomly dispersed graphene platelets to be relatively electrically conductive due to non-varnishing electrical conductivity mechanism.

However a dispersion of the graphene platelets in a rubber composition is electrically non-conductive when a significant portion of the platelets are oriented parallel to each other in the rubber composition which thereby renders the rubber composition containing the oriented graphene platelet to be electrically non-conductive due to poor through-plane electrical conductivity of the graphene platelets.

This phenomenon is significant and important.

When the large exfoliated graphene platelets are of a relatively large lateral size (e.g. an average lateral dimension greater than 1 micrometers, especially larger than 5 micrometers) they tend to be oriented in a direction aligned with the platelets plains when the rubber composition is processed in the processing direction such as by, for example, milling and calendering, and such alignment thereby promotes electrical conductivity for the rubber composition in a direction parallel to the graphene platelet alignment. However, the rubber composition typically exhibits a rather poor electrical conductivity in a direction perpendicular to the graphene platelet alignment.

However, the very small nano-sized graphene platelets for this invention (e.g. 0.1 to 1 micrometer, and particularly 0.1 to 0.5, micrometer lateral dimension) have been observed to more randomly disperse in different plane directions in a rubber composition upon processing the rubber composition which is an important phenomenon to promote high electrical conductivity for the rubber composition which is not limited to the processing direction of the rubber composition.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a rubber composition is provided which comprises, based upon parts by weight per 100 parts by weight rubber (phr):

(A) 100 phr of at least one diene-based elastomer,
(B) about 20 to about 120 phr, alternately from about 35 to about 100 phr, of at least one reinforcing filler, comprised of
  (1) precipitated silica or a combination of rubber reinforcing carbon black and precipitated silica (synthetic amorphous silica containing hydroxyl groups), preferably comprised of at least about 40 phr of precipitated silica, and
  (2) about 0.5 to about 30, alternately from about 1 to about 10, phr of exfoliated graphene platelets having an average thickness in a range of from about 1 nm to about 5 nm;
wherein said exfoliated graphene platelets have an average lateral dimension in a range of from about 0.1 to about 100 micrometers or in a range of from about 5 to about 100 micrometers, or
wherein said exfoliated graphene platelets are restricted to nano-sized exfoliated graphene platelets having an average lateral dimension in a range of from about 0.1 to about 1, about 0.1 to about 0.5 or from about 0.1 to about 0.3 micrometers.

As previously indicated, the exfoliated graphene platelets are provided in a nano-sized scale to promote heat and electrical conductivity of the rubber composition which, combined with their very small lateral dimension size are also provided to promote filler-rubber interaction and resulting enhanced reinforcement of the rubber composition as well as electrical and thermal conductivity of the rubber composition.

While particulate carbon black and amorphous silica (precipitated silica), and sometimes clay, have heretofore been used for reinforcing rubber compositions for various tire components, a tire with one or more component(s), rubber compositions for tire components which contain the nano-sized exfoliated graphene platelets is considered herein to be novel and a significant departure from past practice.

In one embodiment, it is envisioned that the nano-sized graphene platelets may be coupled to the diene-based elastomer(s) of the rubber composition by a graphene coupling agent relying on pi-pi (n-n) bonding to the graphene platelets and sulfur bonding to, or sulfur co-curing with, the diene based elastomer(s). There the graphene coupling agent has a moiety with pi electron configuration to bond to the graphene platelets also having a pi electron configuration to from a pi-pi network and another different moiety comprised of a polysulfide moiety to interact with carbon-to-carbon double bonds of the diene-based elastomer(s) of the rubber composition or comprised of a carbon-to-carbon double bond to sulfur co-cure with the diene-based elastomer(s). In this embodiment, it is envisioned that the moiety of the graphene coupler having a pi electron configuration has a general formula, or chemical structure, (I):

Representative examples of such graphene coupler compounds is illustrated by the following Chemical Structure (1), (2) and (3). Such Chemical Structure (I) is presented as having one part of all conjugated carbon structure which can interact with graphene through pi-pi interaction.

In the Chemical Structure (1), A represents the backbone of the graphene coupler, which is a low molecular weight polymer of polyaryleneethynylene, including but not limited to, the following polymers, poly(phenylene ethynylene), poly(thiophene ethynylene), and poly(fluorene ethynylene). In the Chemical Structure (1), B represents optional side chains attached to the coupler backbone A as compatiblizer to diene-based elastomer matrix, which can be, for example, at least one alkane hydrocarbon group containing from 6 to 20 carbon atoms such as, for example, one or more of decane, nonane, octane, heptane and hexane groups. In the Chemical Structure (1), to enhance the coupler reaction to the diene-based elastomer, a polysulfide end functional group, C, is attached to the coupler backbone A. C can be, for example, at least one 1,2-dithiane functional group which contains an average of from 2 to about 4 connecting sulfur atoms.

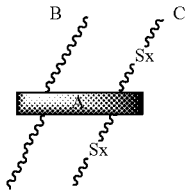

Chemical Structure (1)

In the following Chemical Structure (2), D represents a pyrene structure which can stack to the graphene surface by pi-pi interaction, while E represents a polysulfide moiety containing 2 to 4 sulfur atoms which can react with the diene-based elastomers.

D-E   Chemical Structure (2)

In the following Chemical Structure (3), D represents a pyrene structure, F represents functional groups containing carbon-carbon double bond which can interact with diene-based elastomers by sulphur co-cure process (sulfur co-curing of the compound of Chemical Structure (3) with diene based elastomers).

Chemical Structure (3)

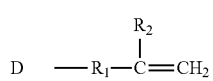

For Chemical Structure (3), $R_1$ can be any carbonhydrate connection, for example an ester connecting group, and $R_2$ can be hydrogen or —$CH_3$ radical.

One example of the graphene coupling agent can be 1-Pyrenemethyl methacrylate, and the chemical structure is shown in the following, which is an example of Chemical Structure (3).

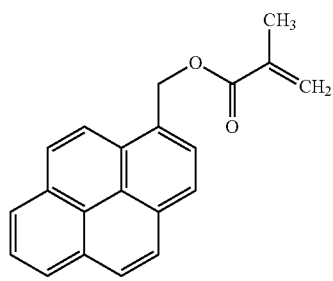 [SMILES: C=C(C)C(=O)OCc1ccc2ccc3cccc4ccc1c2c34]

In further accordance with this invention, a tire is provided having at least one component comprised of the rubber composition of this invention.

Representative of such tire components are, for example and not intended to be limiting, tread, apex, sidewall, chafer and tire carcass components.

In practice, various diene-based elastomers may be used for the rubber composition and tire component such as, for example, polymers and copolymers comprised of at least one monomer comprised of at least one of isoprene and 1,3-butadiene and from styrene copolymerized with at least one of isoprene and 1,3-butadiene.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In one aspect, the conjugated diene-based elastomer may be an elastomer such as, for example, styrene/butadiene copolymer containing at least one functional group reactive with hydroxyl groups on a precipitated silica such as, for example, comprised of at least one of siloxy, amine and imine groups.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates employed in this invention are typically obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 309 (1938), as well as ASTM D5604 for precipitated silica.

The silica may also be typically characterized by having a dibutylphthalate (DBP) absorption value in a range of about 50 to about 400 cc/100 g, and more usually about 100 to about 300 cc/100 g (ASTM D2414).

Various commercially available precipitated silicas may be considered for use in this invention such as, only for example herein, and without limitation, silicas from PPG Industries under the Hi-Sil trademark with designations Hi-Sil 210, Hi-Sil 243, etc.; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

Various coupling agents, as previously described, may be used if desired to aid in coupling the silica (e.g. precipitated silica with hydroxyl groups on its surface), as well as interacting with said functionalized exfoliated graphene platelets.

THE DRAWING

In FIG. 1 (FIG. 1) a sequential representation of oxidative intercalation of layered graphite (1) followed by exfoliation of the intercalated graphite into graphene platelets (4) is depicted.

In particular, the partial cross section of layered graphite (1) is treated with a combination of sulfuric acid and potassium permanganate or nitric acid to penetrate and expand the galleries between the graphite layers (2) sufficient to form small intercalated layered planes of the graphite comprised of expanded graphite layers (3). The expanded layers (3) are treated by thermal exfoliation or chemical exfoliation to cause them to exfoliate (separate from each other) to form nano-scale exfoliated graphene platelets (4).

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing fillers materials such as, for example, the aforementioned rubber reinforcing carbon black and precipitated silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may, for example, comprise about 0.5 to about 10 phr, usually about 1 to about 5 phr. Typical amounts of processing aids, if used, may comprise, for example from about 1 to about 50 phr. Such processing aids can include, for example and where appropriate, aromatic, napthenic, and/or paraffinic processing oils. Typical amounts of antioxidants where used may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants, where used, may comprise for example about 1 to 5 phr. Typical amounts of fatty acids, if used, which can include stearic acid and combinations of stearic acid with one or more of palmitic acid oleic acid and may comprise, for example, from about 0.5 to about 3 phr. Typical amounts of zinc oxide may comprise, for example, from about 1 to about 10 phr. Typical amounts of waxes, such as for example microcrystalline waxes, where used, may comprise, for example, from about 1 to about 5 phr. Typical amounts of peptizers, where used, may comprise, for example, from about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may be used, for example, in an amount ranging from about 0.5 to about 4 phr, or even, in some circumstances, up to about 8 phr.

Sulfur vulcanization accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging, for example, from about 0.5 to about 4, alternately about 0.8 to about 1.5 phr. In another embodiment, combinations of a primary and a secondary accelerator might be used with the secondary accelerator, where used, being usually used in smaller amounts (for example about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used, for example, which are not affected by normal processing temperatures but produce a satisfactory cure at ordinary vulcanization temperatures. Vulcanization retarders might also be used, where desired or appropriate. Suitable types of accelerators that may be used in the present invention may be, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator may be, for example, a guanidine, dithiocarbamate or thiuram compound.

The presence and relative amounts of the above additives are not considered to be an aspect of the present invention, unless otherwise indicated herein, which is more primarily directed to the utilization of functionalized exfoliated graphene platelets in a rubber composition, particularly for tire component.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and reinforcing fillers, including the exfoliated graphene platelets and alternative additional reinforcing fillers such as, for example precipitated silica and rubber reinforcing carbon black mixed in one or more non-productive mix stages. The terms "non-productive" and "productive" mix stages are well known to those having skill in the rubber mixing art.

The following Example is presented to illustrate the invention and is not intended to be limiting. The parts and percentages are by weight unless otherwise designated.

EXAMPLE I

Comparative Example

Rubber compositions were prepared to demonstrate an effect of using conventional sized exfoliated graphene platelets having a lateral dimensional size in a range of from about 5 to about 100 micrometer.

Control rubber Sample A contained silica reinforcement.

Comparative rubber Sample B further contained a dispersion of the exfoliated graphene platelets.

The basic formulation for the rubber composition is illustrated in the following Table 1 where the ingredients are expressed in terms of parts by weight per 100 parts of rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then mixed in a second non-productive mixing stage (NP-2) in an internal rubber mixer for about 4 minutes to a temperature of about 160° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

TABLE 1

| | Parts (phr) |
|---|---|
| First Non-Productive Mixing Step (NP1), Mixed to 160° C. | |
| Styrene/Butadiene rubber (SSBR)[1] | 70 |
| Cis 1,4-polybutadiene rubber (BR)[2] | 30 |
| Carbon black, rubber reinforcing (N121)[3] | 5 |
| Silica, precipitated[4] | 65, 59 |
| Silica coupling agent[5] | 5.2, 4.7 |
| Wax, microcrystalline and paraffin | 2 |
| Fatty acid[6] | 2 |
| Antioxidant(s) | 2 |
| Zinc oxide | 3.5 |
| Rubber processing oil | 20 |
| Graphene, exfoliated, platelets | 0, 6 |

TABLE 1-continued

| | Parts (phr) |
|---|---|
| Productive Mixing Step (PR), Mixed to 110° C. | |
| Sulfur | 1.7 |
| Accelerator(s)[7] | 3.1 |

[1]Solution polymerization prepared styrene/butadiene copolymer rubber (SSBR) as a tin coupled styrene/butadiene copolymer elastomer (having about 21 percent bound styrene) and containing end chain siloxy functional group reactive with hydrogen groups of a precipitated silica as CE92M ™ from Styron
[2]Cis 1,4 polybutadiene rubber as a high cis 1,4-polybutaaciene prepared by neodymium based catalyst polymerization of 1,3-butadiene as CB25 ™ from Lanxess
[3]Rubber reinforcing carbon black as N121, an ASTM designation
[4]Precipitated silica as Zeosil ™ Z1165 MP from the Rhodia Company
[5]Coupling agent comprised of bis(3-triethoxysilylpropyl) polysulfide having an average of from about 2 to about 2.6 connecting sulfur atoms as Si266 ™ from Evonik Degussa
[6]Mixture of fatty acids comprised of stearic, palmitic and oleic acids
[7]Sulfenamide and diphenyl guanidine sulfur cure accelerators The following Table 2 represents the uncured and cured behavior and various physical properties of the rubber compositions based upon the basic formulation of Table 1, and reported as rubber Samples A and B.

TABLE 2

| | Control (phr) A | Comparative (phr) B |
|---|---|---|
| Styrene/butadiene rubber | 70 | 70 |
| Cis 1,4-polybutadiene rubber | 30 | 30 |
| Graphene, exfoliated, platelets | 0 | 6 |
| | | (3.1 wt %) |
| Carbon black | 5 | 5 |
| Precipitated silica | 65 | 59 |
| Silica coupling agent | 5.2 | 4.7 |
| Properties | | |
| RPA test (Rubber Process Analyzer) | | |
| Uncured dynamic storage modulus G' (KPa) At 10% strain, 11 Hertz, 100° C.; | 0.26 | 0.3 |
| Dynamic storage modulus G' (MPa) | 1.9 | 2 |
| Tan delta | 0.135 | 0.127 |
| MDR test; 60 minutes at 150° C. | | |
| Maximum torque (dN-m) | 22.8 | 24.2 |
| Minimum torque (dN-m) | 3.5 | 3.9 |
| T90 (minutes) | 13.2 | 10.4 |
| Stress-strain | | |
| Tensile strength (MPa) | 14.8 | 14.3 |
| Elongation at break (%) | 414 | 376 |
| 100% modulus, ring, (MPa) | 2.3 | 3.4 |
| 300% modulus, ring, (MPa) | 10.6 | 12.1 |
| Rebound (Zwick) | | |
| 23° C. | 46 | 48 |
| 100° C. | 62 | 66 |
| Shore A Hardness | | |
| 23° C. | 65 | 68 |
| 100° C. | 62 | 66 |
| DIN abrasion[1] | 104 | 131 |
| Thermal conductivity (W/m/K)[2] | 0.266 | 0.351 |
| Electrical conductivity (S/cm)[3] | $2.6E^{-15}$ | $3.1E^{-15}$ |

[1]DIN abrasion test (ASTM D53516) is a rotary drum abrasion resistance test of the rubber compounds. The abrasion resistance is measured by moving a test piece sample across the surface of an abrasive sheet mounted to a revolving drum, and expressed as volume loss in mm³. The abrasiveness of the sample is determined by comparing to a standard and calculated to a specific nominal abrasive value. A smaller value indicates better abrasion resistance.
[2]Thermal conductivity was measured by a Hot Disk Thermal Conductivity Analyzer, Hot Disk TPS 2500, with Probe Type 5501. The test was conducted at ambient (23° C.) temperature. The thermal conductivity unit is expressed as Watts/meter/Kelvin degrees temperature.
[3]Electrical conductivity was measured by a four-point probe electrical conductivity analyzer, Keithley 6517A. The electrical conductivity unit used is Siemens/centimeter.

It can be seen from Table 2 that the thermal conductivity of the 5 phr graphene platelet containing Comparative rubber Sample B increased to a value of 0.351 W/m/k as compared to a value of the silica reinforcement containing Control rubber Sample A with a value of 0.266 W/m/K, an increase of 32 percent in the thermal conductivity.

This is considered herein to be significant in a sense that the increase of thermal conductivity can in turn reduce the tire component cure time and thereby promote an increase in rate of tire production. The increase of the thermal conductivity can also result in a cooler tire operation temperature, which can be beneficial to promote the tire durability and tire life.

It can also be seen from Table 2 that the hysteresis of the exfoliated graphene platelet-containing Comparative rubber Sample B was lower than that of Control Sample A, as indicated by its Tan delta value (10 percent, 11 Hz, 100° C.) and also 23° C. and 100° C. Rebound properties.

This is considered herein to be significant in a sense that the lower hysteresis value of the Comparative rubber Sample B containing the exfoliated graphene platelets can promote mean improved (reduced) rolling resistance for a tire containing a tread of such rubber composition.

In summary, it is concluded that incorporation of conventional sized exfoliated graphene platelets into the rubber composition has the benefits of improved thermal conductivity and reduced hysteresis (tire rolling resistance benefits).

EXAMPLE II

Rubber compositions were prepared to evaluate an effect of using very small, nano-sized exfoliated graphene platelets with an average thickness in a range of from about 0.1 to about 5 nanometers (nm) and a significantly small average lateral dimensional size of about 0.1 to 0.3 micrometer.

Water suspensions of the exfoliated graphene platelets are individually mixed with a natural rubber latex to which a small amount of formic acid was added to co-precipitate the graphene platelets and natural rubber (cis 1,4-polyisoprene rubber) to thereby create a natural rubber masterbatch comprised of the natural rubber and a dispersion of the exfoliated graphene platelets (about 3 to about 10 phr of the exfoliated graphene platelets).

Rubber compositions are referred in this Example as Control rubber Sample C and Experimental rubber Sample D.

Control rubber Sample C was a rubber sample based on natural rubber containing a dispersion of rubber reinforcing precipitated silica.

Experimental rubber Sample D was the above masterbatch comprised of natural rubber sample containing the exfoliated graphene platelets.

The basic formulation for the rubber composition is illustrated in the following Table 3 where the ingredients are expressed in terms of parts by weight per 100 parts of rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature of about 170° C. If desired, the rubber mixture may then mixed in a second non-productive mixing stage (NP-2) in an internal rubber mixer for about 4 minutes to a temperature of about 170° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

The lateral dimension of the exfoliated graphene platelets could be analyzed, for example, with a scanning electron microscope (SEM) and with a transmission electron microscope (TEM).

TABLE 3

| | Parts (phr) |
|---|---|
| First Non-Productive Mixing Step (NP1), Mixed to 170° C. | |
| Natural Rubber (cis 1,4-polyisoprene rubber) | 100 |
| Carbon black, rubber reinforcing (N121) | 6 |
| Silica, precipitated[1] | 50, 45 |
| Silica coupling agent[2] | 6, 5 |
| Exfoliated nano-sized graphene platelets[3] | 0, 5 |
| Wax, microcrystalline and paraffin | 3.5 |
| Fatty acid[4] | 2 |
| Antioxidants | 3 |
| Zinc oxide | 3 |
| Rubber processing oil | 3 |
| Productive Mixing Step (PR), Mixed to 110° C. | |
| Sulfur | 1.7 |
| Accelerator(s)[5] | 3 |

[1]Precipitated silica as Zeosil ™ Z1165 MP from the Rhodia Company
[2]Coupling agent comprised of bis(3-triethoxysilylpropyl) tetrasulfide having an average of from about 3 to about 4 connecting sulfur atoms as Si69 ™ from Evonik Degussa
[3]Nano-sized exfoliated graphene platelets
[4]Fatty acid comprised of stearic, palmitic and oleic acids
[5]Sulfenamide and diphenyl guanidine sulfur cure accelerators The following Table 4 represents the uncured and cured behavior and various physical properties of the rubber compositions and reported as rubber Samples C and D.

TABLE 4

| | Control C | Experimental D |
|---|---|---|
| Natural Rubber (phr) | 100 | 100 |
| Nano-Sized exfoliated graphene platelets (phr) | 0 | 5 (3.29 wt %) |
| Carbon black (phr) | 6 | 6 |
| Precipitated silica (phr) | 50 | 45 |
| Silica coupling agent (phr) | 6 | 5 |
| Properties | | |
| RPA test (Rubber Process Analyzer) | | |
| Uncured dynamic storage modulus G' (KPa) At 10% strain, 11 Hertz, 100° C.; | 0.155 | 0.371 |
| Dynamic storage modulus G' (MPa) | 1.9 | 3.4 |
| Tan delta | 0.08 | 0.133 |
| MDR test; 60 minutes at 150° C. | | |
| Maximum torque (dN-m) | 16.97 | 22.54 |
| Minimum torque (dN-m) | 1.67 | 4.26 |
| T90 (minutes) | 9.02 | 10.27 |
| Stress-strain | | |
| Tensile strength (MPa) | 25.1 | 16.8 |
| Elongation at break (%) | 513 | 272 |
| 100% modulus, ring, (MPa) | 2.5 | 5 |
| 200% modulus, ring, (MPa) | 7.2 | 13 |
| Rebound (Zwick) | | |
| 23° C. | 55 | 42 |
| 100° C. | 68 | 54 |
| Shore A Hardness | | |
| 23° C. | 66 | 78 |
| 100° C. | 58 | 68 |
| DIN Abrasion[1] | 122 | 13 |
| Thermal Conductivity (W/m/K)[2] | 0.245 | 0.318 |
| Electrical conductivity (S/cm)[3] | $2.4E^{-16}$ | $2.5E^{-12}$ |

[1]DIN abrasion test (ASTM D53516) is a rotary drum abrasion resistance test of the rubber compounds. The abrasion resistance is measured by moving a test piece sample across the surface of an abrasive sheet mounted to a revolving drum, and expressed as volume loss in $mm^3$. The abrasiveness of the sample is determined by comparing to a standard and calculated to a specific nominal abrasive value. A smaller value indicates better abrasion resistance.
[2]Thermal conductivity was measured by a Hot Disk Thermal Conductivity Analyzer, Hot Disk TPS 2500, with Probe Type 5501. The test was conducted at ambient (23° C.) temperature. The thermal conductivity unit is expressed as Watts/meter/Kelvin degrees temperature
[3]Electrical conductivity was measured by a four-point probe electrical conductivity analyzer, Keithley 6517A. The electrical conductivity unit used is Siemens/centimeter.

From Table 4 it is observed that about a 30 percent increase of thermal conductivity can, in turn, reduce a predictive tire component cure time by, for example, an amount of from about 5 to about 15 percent and thereby promote an increase in rate of tire production. The increase of the thermal conductivity can also result in a cooler tire operation temperature, which can be beneficial to promote the tire durability and tire life.

It can be seen from Table 4 that for the nano-sized exfoliated graphene platelets their small lateral dimension size was very reinforcing to rubber compounds due to nanoscale dispersion of the graphene platelets in the rubber compounds as compared to the more conventional sized graphene platelets illustrated in Table 2 of Example I.

For example, with only 5 phr (3.29 wt percent) of the nano-sized graphene platelets replacing 5 phr silica in the rubber composition, the dynamic modulus G' (10 percent, 11 Hz, 100° C.) increased from 1.9 MPa to 3.4 MPa, and the 100 percent modulus increased from 2.5 MPa to 5.1 MPa, with the 200 percent modulus increasing from 7.2 MPa to 13 MPa as compared to the silica-containing Control Rubber Sample D. This means that the nano-sized graphene platelets are observed to be a much more rubber reinforcing filler than the precipitated silica. Therefore, a small amount of nano-sized graphene platelets have the potential to replace larger amounts of the precipitated silica and maintain the same stiffness of the rubber composition.

This is considered herein to be significant in a sense that the rubber compositions containing the significantly smaller exfoliated graphene platelet size may be useful for tire components desired to exhibit stiff properties such as for example tire apex and chafer components.

In this Example, a further experiment was conducted to evaluate a threshold percolation level (content) for the nano-sized exfoliated graphene platelets in natural rubber based composition.

The experiment was conducted with a rubber composition composed of only three ingredients, namely natural rubber, dicumyl peroxide curative and nano-sized exfoliated graphene platelets described in Example II as being prepared by co-coagulation of the graphene platelets and natural rubber latex.

The rubber compositions are identified as rubber Samples F through I with rubber Sample F being a Control without the nano-sized exfoliated graphene platelets and with the Experimental Rubber Samples G thorough I containing progressively increasing levels of the co-coagulated nano-sized exfoliated graphene platelets.

The following Table 5 is presented to show the electrical and thermal conductivities of the nano-sized graphene reinforced rubber Samples F, G, H and I, as a function of progressively increasing the nano-sized graphene platelet loadings of 0, 1, 3, and 5 phr respectively.

TABLE 5

|  | Control | Experimental | | |
|---|---|---|---|---|
|  | F | G | H | I |
| Natural rubber (phr) | 100 | 100 | 100 | 100 |
| Nano-sized graphene platelets | 0 | 1 | 3 | 5 (4.71 wt %) |
| Dicumyl Peroxide (phr) | 1 | 1 | 1 | 1 |
| Properties |  |  |  |  |
| Electrical Conductivity (S/cm) | $2.4E^{-16}$ | $4.7E^{-15}$ | $1.9E^{-12}$ | $6.3E^{-7}$ |
| Thermal Conductivity (W/m/k) | 0.158 | 0.168 | 0.193 | 0.219 |

It can be seen from Table 5 that the thermal conductivity of nano-sized exfoliated graphene platelet rubber-containing rubber Sample I increased by 39 percent with 5 phr (4.71 wt percent) of the functional exfoliated graphene platelet loading as compared to Control rubber Sample F which did not contain the nano-sized exfoliated graphene platelets.

This is considered herein to be significant in a sense that such thermal conductivity enhancement can result in shorter tire cure time and resultant higher rate of tire production. In addition, the enhancement in thermal conductivity can also result in cooler tire operation temperature and thus better tire durability.

Therefore, from Table 5, we can also see that addition of 5 phr (4.71 wt percent) of the nano-sized exfoliated graphene platelets into the rubber compounds percolated the rubber composition, in another word, transformed the compounds from a insulating material to a conductive compound. For example, the electrical conductivity of rubber Sample F is seen to increase by 9 orders of magnitude by addition of 5 phr (4.71 wt percent) of graphene.

High electrical conductivity with small amount of nano-sized graphene platelet loading of 5 phr (4.71 wt percent) is a desirable property for tire application where it is desired that a tire to have an increased electrical conductivity to dissipate static electrical charge.

In summary, this is considered to be a discovery of achieving a combination of high electrical conductivity with thermal conductivities combined with physical properties resulting from mechanical reinforcement for the rubber compounds with small amount of nano-sized exfoliated graphene platelet loadings.

While various embodiments are disclosed herein for practicing the invention, it will be apparent to those skilled in this art that various changes and modifications may be made therein without departing from the spirit or scope of the invention.

What is claimed is:

1. A rubber composition which comprises, based upon parts by weight per 100 parts by weight rubber (phr):
   (A) 100 phr of at least one diene-based elastomer,
   (B) about 20 to about 120 phr of at least one reinforcing filler, comprised of
      (1) precipitated silica or a combination of rubber reinforcing carbon black and precipitated silica (synthetic amorphous silica containing hydroxyl groups), together with a silica coupler for said precipitated silica having a moiety reactive with hydroxyl groups on said precipitated silica and another different moiety interactive with said diene-based elastomer(s), and
   (2) about 0.5 to about 30 phr of exfoliated graphene platelets having an average thickness in a range of from about 1 nm to about 5 nm and an average lateral dimension in a range of from about 0.1 to about 100 micrometers,
      wherein the graphene platelets are coupled to said diene-based elastomers(s) with a graphene coupling agent comprised of a moiety containing pi electrons and another different moiety comprised of a polysulfide containing an average of 2 to 4 connecting sulfur atoms.

2. The rubber composition of claim 1 wherein said exfoliated graphene platelets are nano-sized graphene platelets having an average lateral dimension in a range of from about 0.1 to about 1 micrometers.

3. The rubber composition of claim 1 wherein exfoliated graphene platelets have an average lateral dimension in a range of from about 5 to about 100 micrometers.

4. The rubber composition of claim 1 wherein the graphene platelets are combined with said diene-based elastomers(s) with a graphene coupling agent comprised of a moiety containing pi electrons and another different moiety containing carbon-to-carbon double bonds available to sulfur co-cure with said diene-based elastomer(s).

5. The rubber composition of claim 1 wherein said graphene coupling agent contains a polymeric backbone comprised of a low molecular weight polyaryleneethynylene containing pi electrons and having an end group which contains at least one polysulfide wherein said polysulfide contains an average of from about 2 to about 4 connecting sulfur atoms.

6. The rubber composition of claim 1 wherein said graphene coupling agent is of a general chemical structure (1):

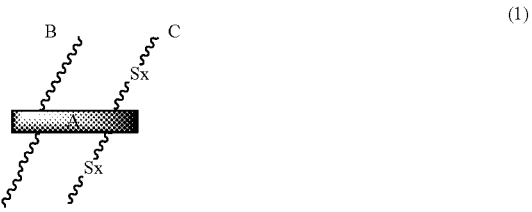

(1)

where A is a polymeric backbone comprised of a polyaryleneethynylene containing pi electrons, B represents optional side chains attached to the coupling agent polymeric backbone A comprised of at least one alkane hydrocarbon group containing from 6 to 20 carbon atoms and C represents at least one polysulfidic moiety attached to the coupler backbone A wherein said polysulfide moiety(ies) is(are) represented by $S_x$, where x is an average value in a range of from about 2 to about 4.

7. The rubber composition of claim 1 wherein said graphene coupling agent is of a general chemical structure (2):

(2)

wherein D represents a pyrene structure containing a pi electron configuration and E represents at least one polysulfidic moiety, said polysulfide moiety(ies) containing an average of from 2 to 4 connecting sulfur atoms.

8. The rubber composition of claim 4 wherein said graphene coupling agent is of a chemical structure (3):

D-F    (3)

wherein D represents a pyrene structure containing a pi electron network and F represents a branched alkene containing carbon-to-carbon double bonds capable of sulfur co-curing with said diene-based elastomer(s).

9. The rubber composition of claim 8 wherein said general formula (3) is:

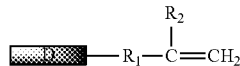—R$_1$—C(R$_2$)=CH$_2$ where R$_1$ and R$_2$ are the same or different alkene or alkyl groups.

10. The rubber composition of claim 4 wherein said graphene coupling agent is comprised of 1-pyrenemethyl methacrylate.

11. The rubber composition of claim 1 wherein said reinforcing filler is comprised of said precipitated silica, together with said silica coupling agent, and nano-sized exfoliated graphene platelets.

12. The rubber composition of claim 1 wherein said diene-based elastomer is comprised of at least one polymer of at least one monomer selected from isoprene and 1,3-butadiene and from styrene copolymerized with at least one of isoprene and 1,3-butadiene.

13. The rubber composition of claim 1 wherein said diene-based rubber is natural cis 1,4-polyisoprene rubber.

14. The rubber composition of claim 13 wherein said natural cis 1,4-polyisoprene rubber is a coagulated natural rubber latex containing said nano-sized graphene platelets co-coagulated with said natural rubber latex.

15. The rubber composition of claim 1 wherein at least one of said diene-based elastomer(s) is at least one selected from the group consisting of tin coupled organic solution polymerization prepared styrene/butadiene co-polymers, isoprene/butadiene copolymers, styrene/isoprene copolymers, polybutadiene and styrene/isoprene/butadiene terpolymers.

16. The rubber composition of claim 1 wherein said diene-based elastomer contains at least one functional group reactive with hydroxyl groups on a precipitated silica wherein said functional group is comprised of at least one of siloxy, amine and imine groups.

17. A tire having at least one component comprised of the rubber composition of claim 1.

18. A tire having at least one component comprised of the rubber composition of claim 2.

19. A tire having at least one component comprised of the rubber composition of claim 4.

20. A tire having at least one component comprised of the rubber composition of claim 5.

* * * * *